United States Patent

Eolin et al.

[11] 4,132,538
[45] Jan. 2, 1979

[54] INJECTION MOLDING HYDROSILICATES

[75] Inventors: Robert W. Eolin, Corning; Gordon F. Foster, Campbell; Joseph F. Mach; Richard O. Maschmeyer, both of Corning, all of N.Y.

[73] Assignee: Corning Glass Works, Corning, N.Y.

[21] Appl. No.: 828,300

[22] Filed: Aug. 29, 1977

[51] Int. Cl.² .................. C03C 15/00; C03B 7/00; B28B 1/24
[52] U.S. Cl. ................... 65/32; 65/30 R; 65/72; 65/DIG. 14; 264/328
[58] Field of Search .......... 65/30 R, 23, 72, DIG. 14, 65/32; 264/328

[56] References Cited
U.S. PATENT DOCUMENTS

| 3,222,435 | 12/1965 | Mellen, Jr. et al. | 264/328 X |
| 3,725,023 | 4/1973 | Parris | 65/72 |
| 3,791,808 | 2/1974 | Thomas | 65/30 R |
| 3,882,210 | 5/1975 | Crossley et al. | 264/328 X |
| 3,948,629 | 4/1976 | Bartholomew et al. | 65/30 R |
| 3,959,433 | 5/1976 | Savers | 264/328 |

Primary Examiner—S. Leon Bashore
Assistant Examiner—F. W. Miga
Attorney, Agent, or Firm—Clinton S. Janes, Jr.; Clarence R. Patty, Jr.

[57] ABSTRACT

This invention relates to a process for injection molding hydrosilicate glasses and apparati useful therefor. This invention is also concerned with apparati for mixing hydrosilicate glasses while in the fluid state, i.e., when the hydrosilicate glasses have a viscosity between about $10^2$–$10^9$ poises. Finally, this invention describes materials demonstrating ready release of hydrosilicate glasses after contact in fluid form.

10 Claims, 6 Drawing Figures

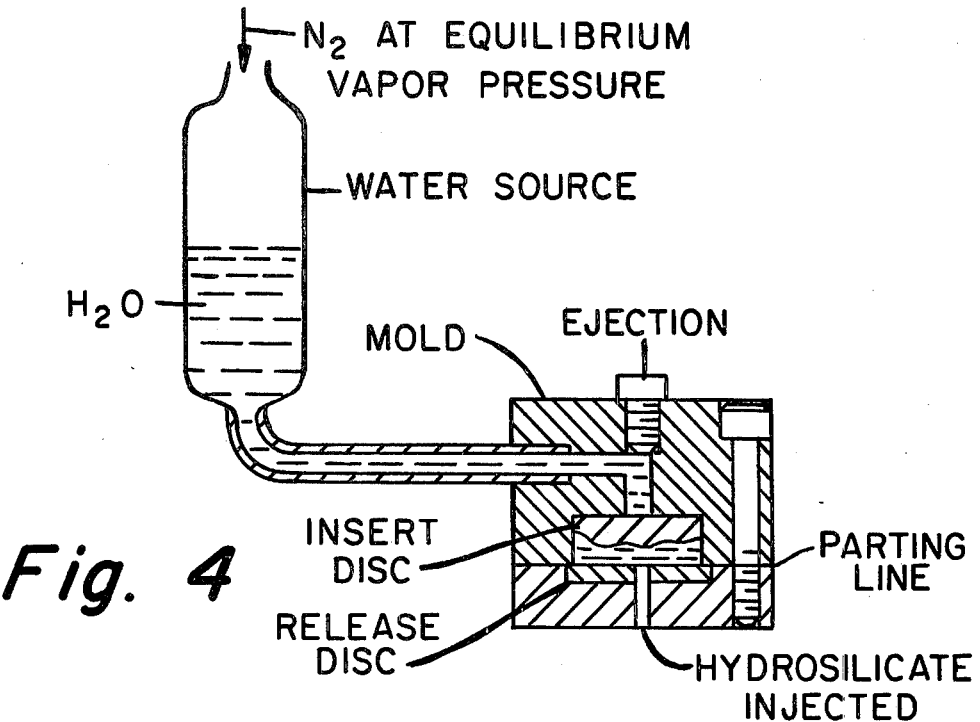
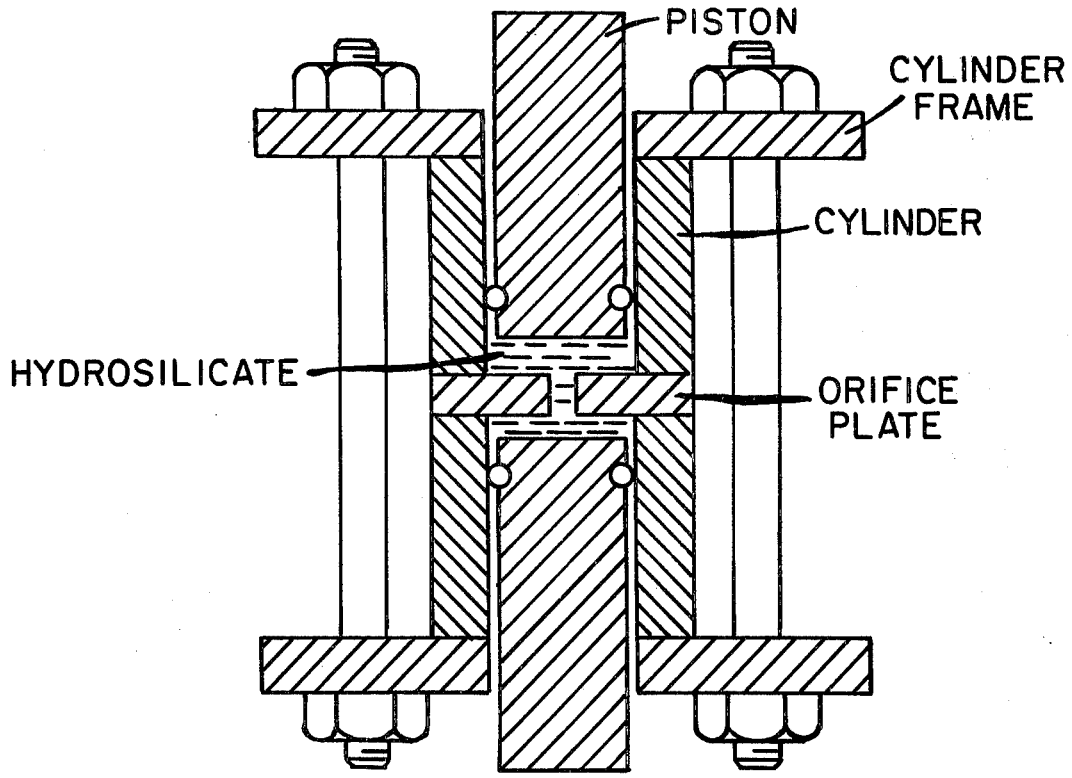

INJECTION MOLDING HYDROSILICATES

BACKGROUND OF THE INVENTION

Glass articles of complex shapes, which exhibit close dimensional accuracy and excellent surface quality, are virtually impossible to produce utilizing conventional hot glass forming methods. Shapes of some complexity and dimensional accuracy can be formed through hot glass molding, but the use of a mold severely limits surface quality. Good surface quality can be secured only by limiting the glass surface to air contact, but that technique permits the production of simple shapes only. Furthermore, shapes with sharp corners cannot be made via hot forming processes. Hence, grinding and polishing are required to obtain sharp corners, high dimensional accuracy, and excellent surface quality. But, unless the desired shape is relatively simple, grinding and polishing involve laborious and expensive hand operations.

Figure 1:
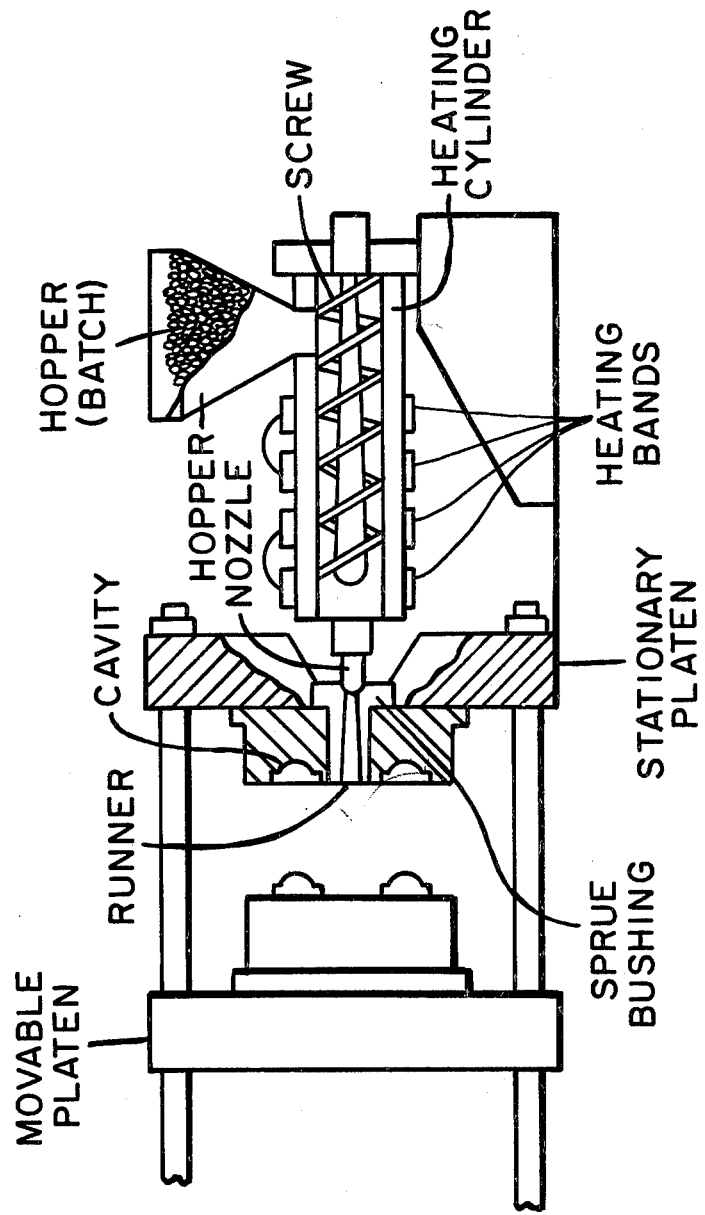

Injection molding is a common plastics molding process which is capable of producing finished parts of complex, intricate shapes with high dimensional accuracy and excellent surface quality. FIG. 1 schematically depicts the general injection molding process as applied to plastics forming. As is represented therein, fluid plastic is injected into a closed, stationary mold. The fluid solidifies, the mold is opened, the plastic body ejected, and the cycle is then repeated. The injection molding apparatus represented in FIG. 1 is equipped with a screw pump. A screw pump is efficient because it permits melting, mixing, and de-airing to be combined with semi-continuous pumping. The screw pump is used solely to fill the cylinder, with the actual injection being accomplished by driving the screw forward in like manner to a piston. Of course, simple piston and cylinder injection molders are known, but their use is no longer common.

The size of an injection molding machine is generally determined by two factors: (1) the volume of plastic that can be injected; and (2) the clamping force holding the mold closed. Injection pressures most typically range between about 10,000 to 20,000 psi, the pressure used striking a balance between filling complex molds quickly and avoiding flash (plastic forced into the parting line of the mold) which can occur when the mold is forced open by the plastic. Thermoplastic materials are customarily injected at whatever temperature yields a zero shear viscosity of approximately $10^4$ poises. High temperatures are desirable to promote fast injection and to prevent freezing of the plastic before the mold is full. The mold is commonly at a lower temperature than the incoming plastic. Temperatures which are too high, however, lead to flash or thermal degradation of the plastic.

It has been repeatedly demonstrated that injection molding machines have the capability of forming articles of plastics over a wide range of operating conditions. The commercial emphasis has been directed to tailoring the operating conditions with the view of minimizing the cycle time and optimizing the process. The cycle time of a well-adjusted apparatus is normally primarily dependent upon the cool down time of the plastic article. Cycle times of about ten seconds are quite common.

The hydration of alkali metal-containing silicate glass bodies to impart thermoplastic properties thereto is well-known to the prior art. For example, U.S. Pat. No. 3,498,802 discloses the hydration of alkali metal silicate glass powders to produce thermoplastic materials and hydraulic cements. In mole percent on the oxide basis, the anhydrous glass powders consisted essentially of 80–94% $SiO_2$ and 6–20% $Na_2O$ and/or $K_2O$, the sum of those components constituting at least 90 mole percent of the total composition. Numerous compatible metal oxides such as $Al_2O_3$, BaO, $B_2O_3$, MgO, PbO, and ZnO can, optionally, be included but CaO and $Li_2O$ are preferably avoided. The hydration procedure contemplates contacting the anhydrous glass powders with a gaseous environment containing at least 50% by weight water at a pressure of at least one atmosphere and a temperature customarily within the range of about 100°–200° C. This treatment in the steam atmosphere is continued for a sufficient length of time to develop at least a surface layer on the powders containing up to 30% by weight $H_2O$. Temperatures of 80°–120° C. are observed as causing the hydrated powders to become adhesive and cohesive thereby enabling the thermoplastic material to be shaped utilizing such conventional forming methods as pressing, rolling, extrusion, and injection molding.

U.S. Pat. No. 3,498,803 describes the hydration of certain glass and glass-ceramic compositions to yield articles exhibiting plastic or rubbery characteristics. The anhydrous glass compositions operable in the invention consist essentially, in mole percent on the oxide basis, of about 6–40% $Na_2O$ and/or $K_2O$ and 6–94% $SiO_2$, the sum of those ingredients constituting at least 85 mole percent of the total composition. BaO, $B_2O_3$, MgO, PbO, $P_2O_5$, and ZnO are mentioned as possible additions with CaO and $Li_2O$ being preferably absent. The hydration process comprehends contacting the anhydrous glass with a gaseous environment containing at least 50% by weight $H_2O$ at a pressure of at least one atmosphere and a temperature conventionally within the range of about 80°–200° C. This treatment in the steam atmosphere is continued for a period of time sufficient to develop at least a surface layer on the glass articles containing between about 5–35% $H_2O$.

U.S. Pat. No. 3,912,481 is drawn to a particular two-step method for steam hydrating alkali metal containing silicate glasses to effect thermoplastic properties therein. The process involves first hydrating an anhydrous glass body consisting essentially, in mole percent on the oxide basis, of about 3–25% $Na_2O$ and/or $K_2O$ and 50–95% $SiO_2$, the sum of those components constituting at least 55% of the total composition, in a steam atmosphere having a relative humidity of at least 75% at a temperature of at least 100° C. and, possibly, up to 600° C. for a sufficient length of time to develop at least a surface portion on the body which is saturated with water. Thereafter, the saturated article is dehydrated via contact with a steam atmosphere wherein the relative humidity is less than 90% of that employed in the hydration step for a length of time sufficient to reduce the water content within the body but leaving an amount therein effective to impart the desired thermoplastic properties thereto. The method permits close control to be exercised over the amount of water retained within the glass body. Such compatible metal oxides as $Al_2O_3$, BaO, $B_2O_3$, CaO, MgO, PbO, and ZnO are noted as being advantageously included.

The patent also discloses the shaping of the so-produced thermoplastic materials utilizing standard compression molding techniques. For example, particles of hydrated glass were run into a mold and then formed into a bulk shape under pressure and temperatures up to 500° C.

U.S. Pat. No. 3,948,629 describes the hydration of alkali metal-containing silicate glass particles in an aqueous solution having a pH less than 6 to develop at least a surface layer on the particles having a water content ranging up to 36% by weight. The operable glass compositions are stated to be the same as those disclosed in U.S. Pat. No. 3,912,481 above. The method involves contacting the glass particles with the solution at a temperature greater than 100° C. and, possibly, up to 374° C. and at a pressure in excess of 20 psi and, possibly, up to 3200 psi. for a sufficient length of time to cause $H_2O$ to be absorbed within the glass in an amount effective to impart thermoplastic properties thereto.

This patent also discloses the shaping of the hydrated particles into bulk shapes via compression molding techniques relying upon the thermoplastic behavior displayed by the particles as a result of the absorbed water. Temperatures up to 500° C. are stated to be suitable.

United States Application Ser. No. 583,606, filed June 4, 1975 by H. E. Meissner, J. E. Pierson, R. D. Shoup, and S. D. Stookey, describes a method for producing microporous silicate glass bodies from precursor sodium and/or potassium hydrosilicate glass bodies, i.e., glass bodies containing about 5–50% by weight water within their structures. Where desired, the microporous bodies can be fired to consolidation as essentially anhydrous, solid glass articles.

The crux of that invention resides in replacing the $Na^+$ and/or $K^+$ ions in the precursor hydrosilicate glass, either partially or totally, with protons and/or other monovalent and polyvalent cations. Where desired, the other chemical species can subsequently be incorporated into the body of the glass in those instances where the species are capable of being sorbed on the porous glass by physical and/or chemical forces. Such chemical species can include polyvalent cations, anions, and neutral molecular species, either organic or inorganic, and complex ions such as metal ammine complexes. The replacement reactions with the $Na^+$ and/or $K^+$ ions and the sorption of the other chemical species take place in an aqueous solution medium. The same solution may contain the additional chemical species to be sorbed or the glass can be contacted with a second solution containing the additional species.

Because the precursor body is hydrosilicate glass and the exchange reaction is carried out in an aqueous solution, the resultant exchange of ions, normally lending to a dealkalization of the glass, can readily take place throughout the entire glass body. Thus, the exchange of ions is not limited to a surface effect but results in a microporous glass body. It is this microporosity which permits the sorption of various chemical species within the interior of the glass, thereby promoting the production of silicate glasses of widely-differing overall compositions, but which compositions can be substantially uniform throughout the body.

The precursor hydrosilicate glass body can be prepared in two ways: (1) an anhydrous sodium and/or potassium silicate glass can be hydrated, e.g., in the manners described in U.S. Pat. Nos. 3,498,802, 3,498,803, 3,912,481, or 3,948,629, supra; or (2) through the drying and shaping of aqueous sodium and/or potassium silicate solutions. Since this latter method does not involve an initial glass melting step, it has the economic advantage of a less energy-intense process. Either process permits the shaping of the hydrosilicate material via compression molding techniques. Normally, the very nature of the material utilized in the second process leads to greater ease in shaping.

In general, the initial sodium and/or potassium hydrosilicate glass body will have an anhydrous composition consisting essentially, by weight on the oxide basis, of about 10–60% $Na_2O$ and/or $K_2O$ and 40–90% $SiO_2$, the sum of $Na_2O$ and/or $K_2O$ + $SiO_2$ constituting at least 75% of the total composition. Up to 25% by weight total of such compatible metal oxides as BaO, $Al_2O_3$, $GeO_2$, $SnO_2$, $As_2O_3$, $B_2O_3$, SrO, MgO, ZnO, $ZrO_2$, CaO, $Sb_2O_3$, and PbO, and such anions as halides, carbonates, chlorates, bromates, iodates, cyanides, sulfides, borates, phosphates, aluminates, plumbates, zincates, chromates, germanates, stannates, antimonates, and bismuthates may be present.

The use of compression molding to form bulk shapes from hydrated granules, from dried silicate solutions, or to reform pre-formed hydrated bodies has, however, several inherent limitations:

(1) pre-formed bodies are limited in thickness dimension because of the long time required for hydration and/or dehydration;
(2) granules require relatively short hydration times but yield molded articles with visible grain boundaries;
(3) molded and reformed articles are restricted to shapes with a region of reasonably constant cross-section;
(4) accurate measurement of charging materials is required to insure control of the size and shape of the article produced;
(5) the molds customarily have precision sliding surfaces in contact with the hydrosilicate material and, therefore, are subject to wear; and
(6) the molds require dynamic sliding seals.

OBJECTIVE OF THE INVENTION

The primary objective of the instant invention is to provide a process capable of producing articles of hydrosilicate glasses having complex, intricate shapes with excellent dimensional accuracy and repeatability and surface quality, and which process is not subject to the aboverecited limitations inherent in compression molding.

SUMMARY OF THE INVENTION

We have found that the above objective can be achieved utilizing an injection molding process. The process permits the formation of articles having sharp corners and makes encapsulation possible. Granules and other thin-dimensioned feed materials can be utilized, with the concomitant advantage of short hydration times, and visible grain boundaries can be made visually non-existent. The size and shape of the article formed are determined by the mold cavity, thereby eliminating the need for accurate charging. Finally, the molds require static seals only and have no precision moving parts in contact with the hydrosilicate material while in the fluid state.

As was noted above, injection molding is a common forming technique in the plastics industry. The process comprises injecting fluid material into a closed, vented, stationary mold, solidifying the fluid, opening the mold, ejecting the article, and then repeating the cycle. We have found that a generally similar process can be made applicable to hydrosilicate materials but, since hydrosilicates are intrinsically different from plastics, the injection molding process must be modified in several significant ways.

First, contrary to the situation with plastics, the injection molding system must be fully sealed and pressurized to prevent water loss to the ambient environment from the hydrosilicate material when it is at flowing temperatures. Accordingly, the injection cylinder must be sealed and pressurized. In practice, a valve will be required to separate the hot, pressurized hydrosilicate material in the injection cylinder from ambient pressure when the mold is open. Inert gas and/or steam is utilized in the mold to apply pressure to the hydrosilicate material so the mold must seal against gases. The mold cavity must be so designed that gas can be vented into the pressurized system as the mold fills to avoid trapping bubbles or pockets of gas.

Second, inasmuch as hydrosilicate materials when heated to temperatures to cause flowing adhere to most common materials, the mold cavity must be constructed of materials which are capable of good release of hydrosilicates plus provide an acceptable combination of formability, toughness, and thermal resistance making then useful construction materials. Such mold materials permit intimate contact of the fluid hydrosilicate with the cavity such that the geometry, dimensions, and surface quality thereof are faithfully transferred to the shaped hydrosilicate article.

Third hydrosilicates exhibit virtually no flow orientation and anisotropy. Those phenomena are prevalent in plastic products and result in preferential stresses with consequent differential shrinkage and warpage.

Fourth, hydrosilicates display a certain inherent brittleness which allows large gates, particularly if designed as stress concentrators. The gate is that part of the molding apparatus constituting a flow restriction immediately before the cavity which permits the molded shape to be separated cleanly.

THE DRAWINGS

FIG. 1 schematically depicts the general prior art injection molding apparatus used in forming plastics.

Figure 2:
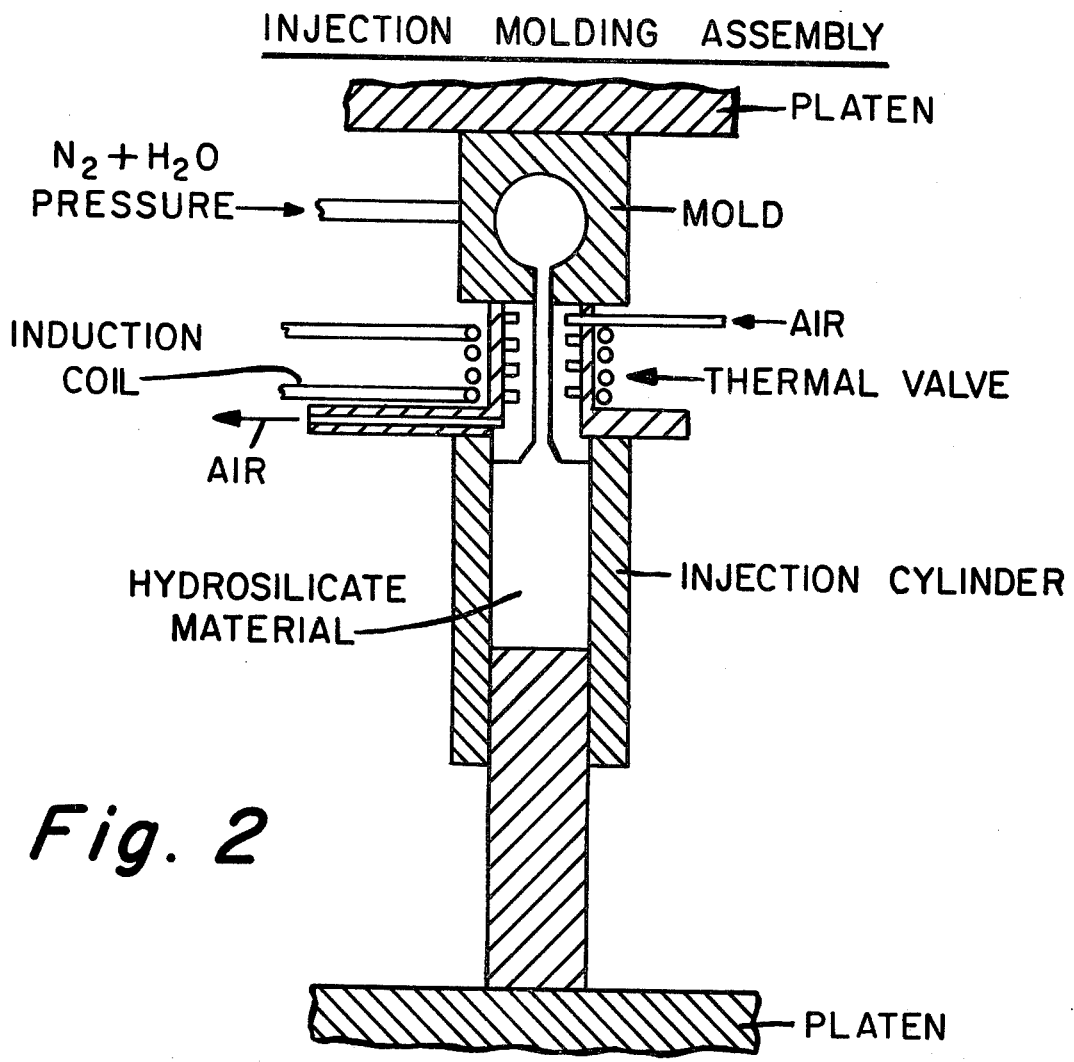

FIG. 2 schematically depicts one apparatus useful in the instant invention.

Figure 3:
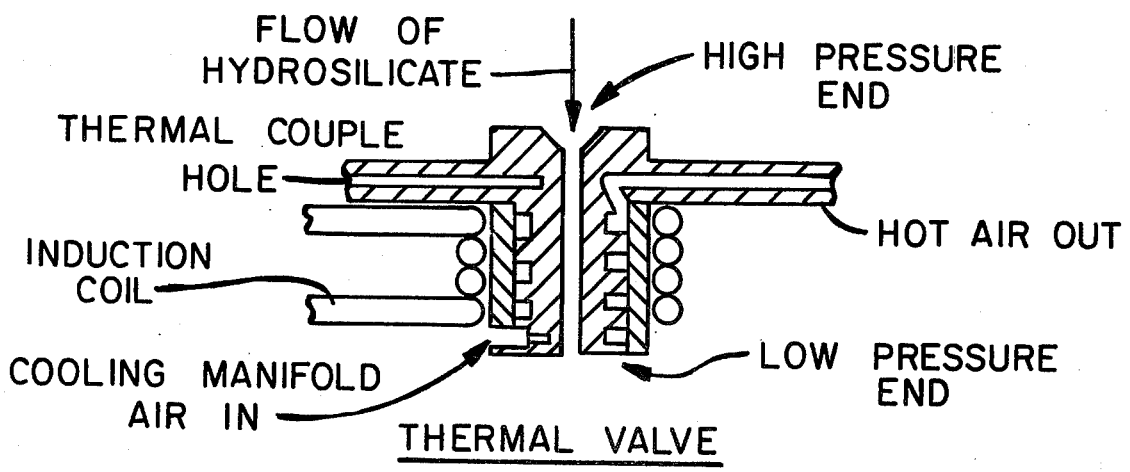

FIG. 3 schematically depicts one design of a thermal valve operable in the instant invention.

FIG. 4 schematically depicts one method for allowing water to flow freely into and out of a mold used in the instant invention.

FIG. 5 schematically depicts one design of mixing apparatus operable in the instant invention.

Figure 6:
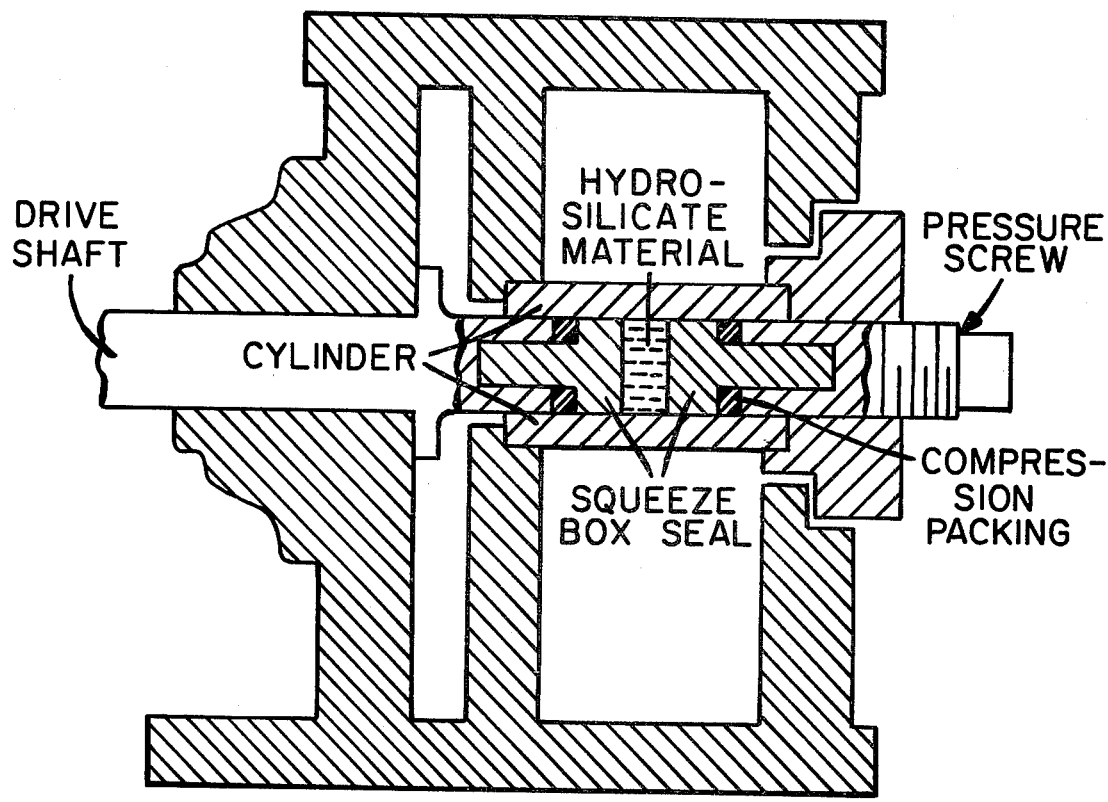

FIG. 6 schematically depicts another design of mixing apparatus operable in the instant invention.

SPECIFIC EMBODIMENTS OF THE INVENTION

Apparatus suitable for injection molding hydrosilicate materials must be designed with the above four characteristics of such materials in mind. FIG. 2 schematically depicts an operable apparatus.

The necessities of a sealed sytem and special mold materials have been noted above. Hydrosilicates are molded at higher viscosities than are plastics. This higher viscosity arises in part from the desirability of low temperatures (less volatilization of absorbed water), but mostly from the fact that hydrosilicates demonstrate Newtonian fluid characteristics whereas plastics are pseudoplastic at injection conditions. Pseudoplastic means that the viscosity of the plastic drops sharply at the high shear rates encountered during rapid flow in small runners and gates. Runners and gates in molds to be utilized with hydrosilicates must be constructed larger to secure equivalent flow rates. The increase in size is effective to achieve the desired ends because flow rate increases as the fourth power of the radius in a round channel. Small gates are demanded in plastics molds for easy, clean separation of the runner and molded shape. Large gates can be tolerated in molds for hydrosilicates, where such are designed as stress concentrators, because hydrosilicates are more brittle than plastics.

Plastics have low thermal diffusivities which permits them to be injected into cold molds. The thermal diffusivity of hydrosilicates is higher and such articles are also much more susceptible to brittle fracture from thermal stresses than plastics. Consequently, because of the possibility of thermal breakage, the larger thermal diffusivity, and the higher viscosity, the use of heated molds is a desirable practice with hydrosilicates. Stated differently, the preferred inventive practice contemplates an isothermal injection process.

The high thermal expansion, flow orientation, anisotropy, and compressibility of plastics limit the dimensional accuracy to which such materials can be injection molded to about 0.002"/inch under the best conditions. Durable hydrosilicates have much lower coefficients of thermal expansion, considerably lower compressibility, and are essentially free from flow orientation and anisotropy. Therefore, because of these characteristics, the dimensional accuracy for injection molded hydrosilicates can exceed that of plastic materials and be greater than 0.001"/inch.

The apparatus illustrated in FIG. 2 contemplates three fundamental elements: (1) an injection cylinder which performs as a high pressure pump to inject the hydrosilicate; (2) a thermal valve which separates the hot, pressurized hydrosilicate in the injection cylinder from ambient pressure when the mold is open; and (3) a mold which must incorporate such features as pressurization capability, constructed of materials demonstrating ready release of hydrosilicates, and having the capability of being heated.

For simplicity of design and ease of description, the injection cylinder depicted in FIG. 2 employs a simple piston and cylinder pump. Such equipment precludes mixing capability within the cylinder and semi-continuous operation. However, the use of a screw pump or a stationary mixer to achieve mixing is well-known in the plastics injection molding art and such would also be applicable here. In FIG. 2, the piston is sealed with a squeeze box seal containing a sandwich of tetrafluoroethylene and graphite-asbestos as the compression packing.

The apparatus represented in FIG. 2 utilizes a thermal gradient to operate as a valve to control the flow of hydrosilicate materials in the processing equipment. In general, equipment for flow processing of fluids, including hydrosilicates, requires valves to control the rate of flow of any fluid between regions of high and low pressure. The design of any mechanical valve to control the flow of hydrosilicates, however, must be capable of surmounting such several severe difficulties as:

(1) the valve must be massive enough to seal against the high viscosity hydrosilicate material (typically at a viscosity of about $10^2$–$10^6$ poises) and yet also be of such precision as to seal against steam having a customary viscosity of about 0.0001 poise;

(2) any water loss from the hydrosilicate produces an abrasive contaminant (anhydrous glass) which causes moving parts to stick and wear;

(3) any hydrosilicate exposed at the low pressure end of the valve may dehydrate or foam, thereby behaving as a contaminant when the valve is opened; and (4) the operating temperatures of the valve in many instances precludes the use of polymeric elastomers as seals.

Those problems were overcome through the use of a thermal gradient to act as the valve. Thus, the cool end of the gradient raises the viscosity of the hydrosilicate and thereby restricts the flow rate. The gradient can be made large enough to stop the flow completely. The cool end can also be cooled sufficiently to prevent dehydration and, hence, prevent contamination. No moving parts are required and high tolerances are unnecessary. In other words, at the cool end of the gradient the hydrosilicate solidifies, forming a plug which prevents flow, seals against steam, and can be exposed to ambient pressure without dehydration. To open the valve, the cool end of the gradient is heated.

FIG. 3 schematically presents one design of thermal valve operable in the present invention. It will be appreciated, of course, that the design details, geometry, and sources of heat and coolant are not critical to the successful operation of the invention. Likewise, the valve need not be a physically distinct unit but may be incorporated as part of another member of the system. For example, the valve may be designed as part of the mold assembly. However, with the valve design illustrated in FIG. 3, the flange end presses into the injection cylinder and the other end mates with the mold (FIG. 2).

The high pressure end of the valve is heated by the reservoir of hydrosilicate (normally the minimum temperature will be at least about 100° C. and the maximum temperature thereof will not exceed about 550° C.). A coolant, customarily air because of convenience and economics, is circulated through the manifold to create a temperature gradient between the high and low pressure ends. Although the extent of the temperature gradient required is dependent upon the composition and water content of the hydrosilicate, a 350° C. gradient is deemed to be a practical maximum. In general, sufficient air will be admitted through the manifold to maintain a 250° C. or less gradient across the valve which will freeze the hydrosilicate and, thereby, close the valve.

The valve is opened by stopping the passage of coolant. Heat from the reservoir of hydrosilicate will gradually warm the valve, but more rapid opening can be achieved by applying external heat thereto. FIG 3 illustrates the use of induction heating because of its quick response time and good control. In the laboratory the valve of FIG. 3 could be heated from ambient temperature to 400° C. in about 15 seconds.

The third major element of the apparatus depicted in FIG. 2 is the mold. Water vapor is commonly introduced through the tube along with, perhaps, an inert gas such as N, He, Ar, or even compressed air. The gases flow around the edge of an insert disc such that, as the mold fills with hydrosilicate material, gas can vent into the pressurized system anywhere on the boundary of the disc. Venting the gases without plugging the vent holes is possible because the viscosities and, hence, the flow rates of the gases and the hydrosilicate typically differ by about eight orders of magnitude.

As has been observed above, hydrosilicates, when heated to such temperatures to cause flow therein, strongly adhere to most common materials. Obviously, this adherence makes the removal of hydrosilicates from molds and other processing equipment quite difficult. Several materials which are known to release hydrosilicates have severe mechanical or thermal limitations which restrict their utility as construction materials for processing equipment. Hence, for example, mica is available only in flat sheet; plastics are soft highly susceptible to abrasion, and useful only at low temperatures; and tungsten carbide is brittle, difficult to form, and available in limited sizes only. Accordingly, there has been a need for materials that would be useful in injection molding equipment for hydrosilicates which not only exhibit excellent release of hydrosilicates but also have the thermal capabilities, abrasion resistance, toughness, and formability necessary for that use.

Two overall solutions have been discovered for that need: first, three commercially available, nickel-molybdenum alloys, viz., Hastelloy ® B, Hastelloy ® C, and Hastelloy ® C-276 manufactured by the Stellite Division of Cabot Corporation, Kokoma, Indiana; and, second, thin films of noble metals and nobel metal alloys.

An approximate composition in weight percent for Hastelloy ® B of 62% Ni, 28% Mo, and 5% Fe is provided in *Metals Handbook,* 8th Edition, Vol. 1, Properties and Selection of Metals, American Society for Metals, Novelty, Ohio at page 1124. At page 1125 of the same *Metals Handbook* is reported an approximate composition in weight percent for Hastelloy ® C of 54% Ni, 17% Mo, 15% Cr, 5% Fe, and 4% W. An approximate composition in weight percent for Hastelloy ® C-276 of 2.5% Co, 14.5–16.5% Cr, 15–17% Mo, 3–4.5% W, 4–7% Fe, 1% Mn, balance Ni is recorded in Bulletin F-30, 356 D, Hastelloy ® alloy C-276, published by Stellite Division, Cabot Corporation, Kokomo, Indiana, copyright 1973.

The nickel-molybdenum alloys retain useful mechanical and corrosion resistant properties up to 1000° C., well above the processing temperatures utilized with hydrosilicates. The alloys are available in numerous forms such as sheet, plate, bar, plate, pipe, and tubing. Furthermore, the materials are ductile, flexible, impact resistant, and can be readily fabricated through a variety of techniques including welding, machining, and press forming. This availability in various forms, the ease of fabrication, and impact resistance highly recommend the use of these alloys in processing equipment for hydrosilicates.

Thin films of noble metals and noble metal alloys containing a predominant proportion of noble metal have been deemed to be even more satisfactory as hydrosilicate release materials. Operable noble metals include gold, silver, and platinum. Copper alone is not suitable but, when alloyed in small amounts to the more noble metals such as silver, the alloy will be operable. Rhodium, ruthenium, palladium, tunsten, nickel and iridium can also be useful when alloyed to noble metals, notably platinum. The films can be applied via various techniques, e.g., vapor deposition, organic deposition, sputtering, and ion plating, the latter two methods being preferred. Thus, such films can be applied to a wide variety of substrates chosen for desired properties other than release, including metals, glasses, and ceramics.

The nickel-molybdenum alloys described above are relatively soft and have a low yield strength, thereby precluding their use for high load applications. Therefore, in an injection mold which is exposed to many tons of clamping force, those nickel-molybdenum alloys must be utilized as an insert in a mold body of a more rigid metal. Such practice obviously leads to fabrication complexities.

In the apparatus pictured in FIG. 2, the temperature of the mold and injection cylinder was raised by means of electric heating bands and the mold was subsequently cooled via a stream of air from a fan.

In operation of the injection assembly described in FIG. 2, injection pressure was provided by a press which was capable of being connected to either of two constant pressures. The low pressure source was a hydraulic accumulator connected to a high pressure nitrogen tank and is used to hold the hydrosilicate without foaming in the injection chamber. The high pressure injection source provided the impetus for injection and included a pressure controlled pump and an accumulator. Mold filing was monitored by means of a linear velocity transducer mounted on the press piston.

Control of water loss from the hydrosilicate during molding is of considerable importance in achieving uniformly reproducible products. The use of an inert gas, e.g., nitrogen, at or above the equilibrium vapor pressure of the composition being molded will prevent foaming of the material and minimize water loss. Some water from the hydrosilicate diffuses into the inert gas which can result in a stiff, water-poor surface susceptible to tearing as the hydrosilicate flows into the mold. Where desired, steam at the equilibrium vapor pressure can be introduced to completely prevent water loss. The pressure required is the equilibrium vapor pressure of the composition being molded, invariably less than or equal to that of water at the same temperature. Higher steam pressures serve to hydrate the body surface whereas lower steam pressures tend to dehydrate the surface.

Although several approaches to introduce steam into the mold are possible, FIG. 4 schematically sets forth a rather simple operable method. The basic concept is to allow water to flow freely into and out of the mold and to control the steam pressure externally. In FIG. 4 the source of external pressure is a nitrogen tank, but a steam boiler would also be suitable.

As can be appreciated, forming shapes from fine-dimensioned bodies of hydrosilicate glass, e.g., granules, frit, ribbon, etc., is especially desirable because such bodies hydrate and dehydrate quickly. Unfortunately, however, hydrosilicate shapes produced from fine-dimensioned bodies commonly contain inhomogeneities, presumed to be primarily water content variations, associated with the granular structure of the starting materials. Similar problems, but of lesser magnitude, are experienced with the use of dried sodium and/or potassium silicate solutions as starting materials. These inhomogeneities are evidenced in a number of phenomena, for example: (1) variations in refractive index, imparting a rippled appearance to the glass; and (2) regions of birefringence, suggesting the presence of residual stress therein. Considerable effort has been expended in attempts to eliminate such inhomogeneities including vacuum molding, varying the particle size of the starting materials, and pre-etching with HF. Whereas some improvement could be observed by following those techniques, none alone or any combination thereof provided visual homogeneity for optical applications. Greatly improved homogeneity can be produced, however, where the hydrosilicate starting materials are mixed in the fluid state.

The specific design of a mixer suitable for mixing granular hydrosilicate materials in the fluid state is not critical but certain operational requirements must be met by the apparatus. First, the mixer must be capable of mixing at high viscosities, viz., $\geq 10^2$ poises. Second, the mixer must provide a closed system capable of being pressurized to preclude water loss. Third, the mixer must permit removal of solid samples to prevent water loss. Fourth, at least that portion of the mixer where the sample is removed must be constructed of a material which provides ready release of the hydrosilicate material.

FIGS. 5 and 6 schematically depict two mixer designs illustrating that hydrosilicate materials can be mixed by either form flow or drag flow. The relatively high viscosity of the hydrosilicate requires a laminar flow mixer design. The complex geometry demanded for good laminar flow mixing is fundamentally incompatible with the simple geometry required for solid sample removal. This incompatibility leads to either a compromise geometry or physically separating the mixture and sample removal processes.

The mixing apparatus represented in FIG. 5 comprises a pair of opposed pistons and cylinders separated by an orifice plate. The cylinders and plate are anchored together within a frame. The pistons are compressed by a second frame which applies pressure to the hydrosilicate material to prevent foaming thereof. Applying pressure on one frame relative to the other squeezes the hydrosilicate through the aperture in the orifice plate. Reversing of the pressure causes consequent reversal of flow. Repeated cycling of the flow results in mixing the hydrosilicate material.

Flow can be induced in the apparatus of FIG. 5 when the temperature within the system has been raised sufficiently to impart a viscosity to the hydrosilicate material of at least $10^9$ poises. Temperature between about 100°–550° C. are generally appropriate therefor. The rise in temperature was promoted through the use of electric heating bands. To prevent water vaporization, the pistons were sealed with squeeze box seals containing sandwich compression packings of tetrafluoroethylene and graphite-asbestos. After mixing, the apparatus is permitted to cool, following which it is disassembled and a solid sample pressed out.

The mixer represented in FIG. 5 is not highly efficient since the flow of the hydrosilicate material is reciprocal. That movement is inclined to return the hydrosilicate to its starting point, thereby tending to unmix it. Hence, numerous cycles are required to achieve subsequent high homgeneity in the shaped article. FIG. 6 sets forth a mixer design which is more efficient than that of FIG. 5. The apparatus depicted in FIG. 5, however, can be useful as a viscometer for measuring the viscosity of hydrosilicate materials. With a known pressure applied to one frame relative to the other, the relative speed of the frames is measured with a linear velocity transducer. Dimensional analysis allows the pressure and maximum speed to be related to the viscosity of the hydrosilicate material in the following terms:

$$\text{Viscosity} = \text{Constant} \times \frac{\text{Pressure}}{\text{Maximum Speed}}$$

The constant is dependent only upon the amount of hydrosilicate material in the apparatus. Its value is obtained through calibration with fluids of known viscosity.

FIG. 6 sets forth a mixer design which is more efficient than that of FIG. 5. The mechanism underlying the mixer design of FIG. 6 involves trapping hydrosilicate material in a cylinder between two discs, one of which rotates to cause the mixing. The disc and cylinder configuration constitutes a compromise between the complex geometry demanded for best mixing and the simple geometry required for solid sample removal.

In operating the mixer, pressure is exerted on the hydrosilicate by tightening the pressure screw. Water loss is prevented with squeeze box seals containing sandwich compression packings of tetrafluoroethylene and graphite-asbestos. The cylinder is heated by means of electric heating bands. With this apparatus, mixing is possible at temperatures where the viscosity of the hydrosilicate material is no more than about $10^6$ poises. In general, homogeneous mixing is obtained after about five minutes at 20 rpm. The cold smaples are pressed out after mixing.

Hydrosilicate glasses having the base anhydrous compositions disclosed in U.S. Pat. No. 3,912,481, supra, have been found to be particularly suitable for the inventive injection molding technique. Those glasses consist essentially, in mole percent on the oxide basis, of about 3–25% $Na_2O$ and/or $K_2O$ and 55–95% $SiO_2$, the sum of those constituents comprising at least 55 mole percent of the total composition. $Al_2O_3$, BaO, $B_2O_3$, CaO, MgO, PbO, and ZnO are observed as being useful additions with MgO being operable up to 35% BaO and PbO being suitable up to 20%, and $Al_2O_3$, $B_2O_3$, CaO, and ZnO having utility up to 25%. The inclusion of other compatible metal oxides is noted, but individual additions of such will preferably be limited to less than about 10%. We have determined the above ranges of glasses to be suitable for mixing and injection molding but with the further finding that PbO can be present up to 45%.

Laboratory experience has demonstrated a particular group of glass compositions within the above ranges which exhibits excellent capability for injection molding and homogenization via mixing in the fluid state. Those glasses, which exhibit good chemical durability after hydration, have anhydrous compositions consisting essentially, in mole percent on the oxide basis, of about 72–82% $SiO_2$, 10–17% $Na_2O$ and/or $K_2O$, and 5–15% ZnO and/or PbO. Up to 5% $Al_2O_3$ and up to 3% $B_2O_3$ and/or BaO and/or MgO may also be included. One glass from this latter group which, after hydration, has proven to be especially amenable to the invention injection molding process has the following approximate anhydrous composition, reported both in terms of mole percent and weight percent.

|  | Mole Percent | Weight Percent |
|---|---|---|
| $SiO_2$ | 77.1 | 73 |
| $Na_2O$ | 10.8 | 10.5 |
| $K_2O$ | 3.0 | 4.5 |
| $Al_2O_3$ | 1.3 | 2 |
| ZnO | 7.8 | 10 |

In preparing the hydrated glasses for the injection molding process of this invention, the general practice set forth in U.S. Pat. No. 3,912,481 will commonly be followed. Thus, utilizing the above-recited exemplary compositions as illustrative examples, the batch ingredients therefor will be blended together, a ball mill customarily being employed to assist in achieving a homogeneous melt, and the mixture then placed into a platinum or silica crucible. The actual batch constituents can consist of any materials, either the oxides or other compounds, which, when melted together, will be converted into the desired oxide composition in the proper proportions. The batch will be melted at 1450°–1600° C. and the melt formed into bodies of fine dimensions. For example, thin ribbon can be rolled which is subsequently fractured into pieces suitable for introduction into the apparatus, or the melt can be immediately formed into glass granules through such conventional methods as passing a thin stream through a hot flame, or running a stream thereof into water or over patterned rolls. Of course, shapes of larger bulk can be formed and then pulverized, but such practice is not economically desirable.

Hydration of the glass fragments or granules is customarily undertaken in an autoclave where there is ready control of steam pressure and temperature. Hydration generally follows the law of diffusion, i.e., at constant temperature and steam pressure the rate of water penetration is a function of the square root of time. Consequently, the period of time demanded to attain complete hydration of a glass body is dependent upon the thickness dimension of the body as well as the glass composition and the temperature and $H_2O$ pressure within the autoclave. Accordingly, as a general rule, higher percentages of alkali metal oxides in the glass compositions lead to more rapid hydration. Likewise, the use of higher temperature and/or higher relative humidities within the autoclave also normally promotes faster hydration. Therefore, whereas hydration can be accomplished at a temperature of 100° C., the preferred practice contemplates temperatures in excess of 200° C., but below the softening point of the anhydrous glass. Commonly, temperatures within the range of about 225°–400° C. are employed. Also, whereas hydration can be achieved utilizing relative humidities of less than 50%, the preferred practice involves relative humidities greater than 50% and, most desirably, greater than 75% for speed in hydration. Patent No. 3,912,481 explains the phenomena of critical temperature (374° C.) and critical pressure (3200 psi) when dealing with $H_2O$-containing atmospheres. The same circumstances and rationale are obtained here.

The manner in which the glass is hydrated comprises no part of the present invention. In general, however, the method described in U.S. Pat. No. 3,912,481 will commonly be employed, not only because of the speed with which hydration can be attained, but also because close control can be had of the water content present in the glass. Hence, the glass is initially exposed to an essentially $H_2O$-saturated atmosphere at high temperatures to hydrate the glass to substantial saturation. Thereafter, the glass is dehydrated in an environment of lower humidity to achieve a desired water content.

Thus, whereas water contents of up to about 35% by weight can be incorporated into the structures of certain glass compositions, the chemical durability of such is customarily very poor. In consequence, the water content will be reduced, normally below about 20% by weight, to achieve a good compromise between the development of thermoplastic behavior and chemical durability. Accordingly, whereas as little as 1% by weight $H_2O$ in the glass structure can impart some thermoplasticity thereto, the preferred practice contemplates between about 3-12% by weight $H_2O$. Such amounts enable forming of the glass to be undertaken at relatively low temperatures while yielding a product of good durability.

As was observed above in the discussion of United States Application Ser. No. 583,606, the method disclosed therein is useful with anhydrous glass starting materials or can simply involve the drying of sodium and/or potassium silicate solutions to yield a hydrosilicate product. Thus, no hydration step per se is necessary. Moreover, because of the high water contents possible in the structure of such products, i.e., up to 50% by weight, much lower temperatures will be operable in the inventive injection molding process. For example, a temperature as low as about 100° C. can be useful.

As was noted earlier, where articles of high homogeneity are demanded, the hydrosilicate glass materials will be mixed while in fluid form prior to molding. Accordingly, the hydrated glass will be heated to a temperature at which the material will have a viscosity ranging between about $10^2$-$10^9$ poises, and, while in this liquid state, mixed together to achieve good homogeneity. Thereafter, the material is fed into an injection molding apparatus. In the preferred embodiment, the mixer is an integral part of the injection molding apparatus.

EXAMPLE A

Discs appearing homogeneous to the eye were prepared from the above-recited glass composition, i.e., the glass composition consisting essentially, in mole percent on the anhydrous basis, of 77.1% $SiO_2$, 10.8% $Na_2O$, 3.0% $K_2O$, 1.3% $Al_2O_3$, and 7.8% ZnO. Thin ribbon (about 0.015" thick) of anhydrous glass was prepared from the proper batch materials and fractured into pieces of random shapes. These pieces were divided into three groups and hydrated in accordance with the practice of U.S. Pat. No. 3,912,481 to water levels of 11%, 8%, and 6% by weight, respectively. The hydrated pieces were then placed into the disc and cylinder mixer represented in FIG. 6. The following table recites the temperatures of mixing employed to yield viscosities of the material of less than $10^6$ poises such that visually homogeneous products could be obtained. Each sample was run at 20 rpm for five minutes. Cold discs were pressed out after mixing.

11% $H_2O$; 300° C.
8% $H_2O$; 325° C.
6% $H_2O$; 350° C.

EXAMPLE B

Other discs appearing homogeneous to the eye were prepared from a glass composition consisting essentially, in mole percent on the anhydrous basis, of 79.5% $SiO_2$ and 20.5% $Na_2O$. Thin ribbon of anhydrous glass was prepared from the proper batch materials and fractured into pieces of random shapes. The pieces were divided into two groups hydrated in accordance with the practice of U.S. Pat. No. 3,912,481 to water levels of 33% and 28% by weight, respectively. The hydrated pieces were thereafter placed into the disc and cylinder mixer schematically depicted in FIG. 6. Because of the high water contents absorbed in the glasses, lower temperatures could be employed to achieve viscosities of the material of less than $10^6$, as is shown in the following table. After a run for five minutes at 20 rpm, cold discs were pressed out of the apparatus

33% $H_2O$; 150° C.
28% $H_2O$; 200° C.

EXAMPLE C

Solid discs about 1" in diameter and $\frac{1}{8}$" thick were injection molded from the above two compositions utilizing the apparatus generally represented in FIG. 2. Ribbon of anhydrous glass of each composition was fractured into pieces and hydrated to the water contents set out in the following table. The table also records the temperatures utilized to insure a glass viscosity of less than $10^6$ poises.

Example A glass, 12.8% $H_2O$, 330° C.
Example A glass, 8% $H_2O$, 375° C.
Example A glass, 6.2% $H_2O$, 410° C.
Example B glass, 35% $H_2O$, 100° C.
Example B glass, 18.1% $H_2O$, 160° C.
Example B glass, 9.8% $H_2O$, 250° C.

We claim:

1. A method for producing an injection molded article composed of a hydrosilicate glass consisting in the steps of:
    (a) feeding fine-dimensioned bodies of hydrosilicate glass containing between about 1-35% by weight $H_2O$ and consisting essentially, on the anhydrous basis in mole percent on the oxide basis, of about 3-25% $Na_2O$ and/or $K_2O$ and 55-95% $SiO_2$, the sum of those components constituting at least 55 mole percent of the total composition, into a mixer which provides a closed system capable of being pressurized to prevent water loss and is capable of mixing at viscosities of about $10^2$-$10^9$ poises;
    (b) mixing said glass in said mixer to achieve good homogeneity at a temperature wherein said glass exhibits a viscosity between about $10^2$-$10^9$ poises, said mixer being pressurized with an inert gas and/or steam at or above the equilibrium vapor pressure of the composition being mixed;
    (c) injecting said glass while at a viscosity of about $10^2$-$10^9$ poises from an injection chamber, which is sealed and pressurized with an inert gas and/or steam at or above the equilibrium vapor pressure of the composition being injected, into a heated mold cavity to produce an article of a desired geometry;
    (d) sealing and pressurizing said mold with an inert gas and/or steam at or above the equilibrium vapor pressure of the composition being molded while said glass is at a temperature such as to have a viscosity of about $10^2$-$10^6$ poises;
    (e) cooling said mold cavity to solidify a glass article therein; and then
    (f) removing said glass article from said mold.

2. A method according to claim 1 wherein said temperature for mixing ranges between about 100°-550° C.

3. A method according to claim 1 wherein said temperature for injecting the glass into the mold cavity ranges between about 100°-550° C.

4. Injection molding according to claim 1 wherein said hydrosilicate glasses contain about 3-12% by weight $H_2O$.

5. Injection molding according to claim 1 wherein said hydrosilicate glasses also contain, in mole percent, up to 35% MgO, up to 20% BaO, up to 45% PbO, up to 25% $Al_2O_3$, up to 25% $B_2O_3$, up to 25% CaO, and up to 25% ZnO.

6. Injection molding according to claim 5 wherein said hydrosilicate glasses consist essentially, in mole percent on the oxide basis, of about 10–17% $Na_2O$ and/or $K_2O$, 5–15% ZnO and/or PbO, and 72–82% $SiO_2$.

7. A method for producing an injection molded article composed of a hydrosilicate glass consisting in the steps of:
  (a) feeding fine-dimensioned bodies of hydrosilicate glass containing between about 1–50% by weight $H_2O$ and consisting essentially, on the anhydrous basis in mole percent on the oxide basis, of about 10–60% $Na_2O$ and/or $K_2O$ and 40–90% $SiO_2$, the sum of those components constituting at least 75 mole percent of the total composition, into a mixer which provides a closed system capable of being pressurized to prevent water loss and is capable of mixing at viscosities of about $10^2$–$10^9$ poises;
  (b) mixing said glass in said mixer to achieve good homogeneity at a temperature wherein said glass exhibits a viscosity between about $10^2$–$10^9$ poises, said mixer being pressurized with an inert gas and/or steam at or above the equilibrium vapor pressure of the composition being mixed;
  (c) injecting said glass while at a viscosity of about $10^2$–$10^9$ poises from an injection chamber, which is sealed and pressurized with an inert gas and/or steam at or above the equilibrium vapor pressure of the composition being injected, into a heated mold cavity to produce an article of a desired geometry;
  (d) sealing and pressurizing said mold with an inert gas and/or steam at or above the equilibrium vapor pressure of the composition being molded while said glass is at a temperature such as to have a viscosity of about $10^2$–$10^6$ poises;
  (e) cooling said mold cavity to solidify a glass article therein; and then
  (f) removing said glass article from said mold.

8. A method according to claim 7 wherein said temperature for mixing ranges between about 100°–550° C.

9. A method according to claim 7 wherein said temperature for injecting the glass into the mold cavity ranges between about 100°–550° C.

10. Injection molding according to claim 7 wherein said hydrosilicate glasses contain up to 25% by weight total of BaO, $Al_2O_3$, $GeO_2$, $SnO_2$, $As_2O_3$, $B_2O_3$, SrO, MgO, ZnO, $ZrO_2$, CaO, $Sb_2O_3$, PbO, halides, carbonates, chlorates, bromates, iodates, cyanides, sulfides, borates, phosphates, aluminates, plumbates, zincates, chromates, germanates, stannates, antimonates, and bismuthates.

* * * * *